United States Patent [19]

Farmer, Jr.

[11] Patent Number: 4,850,519
[45] Date of Patent: Jul. 25, 1989

[54] ASSEMBLABLE TOOL BOX FOR A PICKUP TRUCK

[76] Inventor: Will Farmer, Jr., 6709 Rotherham Rd., Mechanicsville, Va. 23111

[21] Appl. No.: 208,131

[22] Filed: Jun. 17, 1988

[51] Int. Cl.$^4$ .................. B60R 11/06; B60R 9/06
[52] U.S. Cl. .................. 224/42.42; 224/273; 224/328; 312/DIG. 33; 296/37.6
[58] Field of Search .............. 224/42.01, 42.03 R, 224/42.11, 42.42, 42.03 A, 42.46 R, 273, 327, 328; 280/769; 296/37.1, 37.5, 37.6; 206/372, 373; 220/4 F; 312/108, 257 R, 257 SM, DIG. 33

[56] References Cited

U.S. PATENT DOCUMENTS

| | | | |
|---|---|---|---|
| 949,204 | 2/1910 | Stiehl | 296/37.5 |
| 3,640,423 | 2/1972 | Parker et al. | 224/42.42 R |
| 3,800,990 | 4/1974 | Richardson | 224/42.42 |
| 4,288,011 | 9/1981 | Grossman | 224/42.42 |
| 4,718,583 | 1/1988 | Mullican | 224/42.42 |
| 4,770,330 | 9/1988 | Bonstead et al. | 224/42.42 R |

*Primary Examiner*—Henry J. Recla
*Assistant Examiner*—J. Casimer Jacyna
*Attorney, Agent, or Firm*—Larson and Taylor

[57] ABSTRACT

An improvement in a tool box of the type having a lower part which fits across the bed of a pickup truck and an upper part which extends over onto the panels of the pickup truck and a lid covering the upper part. The tool box is made from a plurality of separate components primarily by dividing the tool box transversely and constructing each of the major components in two halves. Prior to assembly into a tool box, these components are arranged into a relatively small generally rectangular package to thereby facilitate shipping and storage.

31 Claims, 12 Drawing Sheets

| TRUCK MODEL | TOTAL LEN. | BOTT. LEN. | BOTT. HEI. | TOTAL DEPTH | TOTAL WIDTH | TOP SECT. DEPTH | BOTT. WIDTH | BOX WIDTH | FRAME LEN. |
|---|---|---|---|---|---|---|---|---|---|
| | A | B | C | D | E | F | G | H | I |
| CHEV. FORD GMC DODGE FLEETSIDE | 70 | 64 | $8\frac{1}{4}$ | $12\frac{5}{8}$ | 20 | 4 | $17\frac{1}{2}$ | $19\frac{1}{2}$ | 69 |
| 88 CHEV. FLEETSIDE | 68 | 62 | $8\frac{1}{4}$ | $12\frac{5}{8}$ | 20 | 4 | $17\frac{1}{2}$ | $19\frac{1}{2}$ | 67 |
| CHEV. & GMC STEPSIDE | 58 | $48\frac{1}{2}$ | $8\frac{1}{4}$ | $12\frac{5}{8}$ | 20 | 4 | $17\frac{1}{2}$ | $19\frac{1}{2}$ | 57 |
| DODGE D-50 CHEVY S-10 FORD RAN. | 59 | 53 | $8\frac{1}{4}$ | $12\frac{5}{8}$ | 20 | 4 | $17\frac{1}{2}$ | $19\frac{1}{2}$ | 58 |
| FORD STEPSIDE | 62 | 52 | $8\frac{1}{4}$ | $12\frac{5}{8}$ | 20 | 4 | $17\frac{1}{2}$ | $19\frac{1}{2}$ | 61 |
| DODGE DAKOTA | 62 | 56 | $8\frac{1}{4}$ | $12\frac{5}{8}$ | 20 | 4 | $17\frac{1}{2}$ | $19\frac{1}{2}$ | 61 |

DIM. IN INCHES

ASSEMBLABLE TOOL BOX FOR A PICKUP TRUCK

FIELD OF THE INVENTION

This invention relates to containers, and more particularly it relates to improvements in containers of the type normally mounted in the bed of a pickup truck.

BACKGROUND OF THE INVENTION

It is well known to use in pickup trucks and the like rugged boxes which are generally mounted toward the front of the bed of the pickup truck and which generally extend completely across the pickup truck, including a lower part which extends down into the bed and an upper part which is longer than the lower part and which generally extends onto and rests on the side panels of the truck. Boxes of this type can have a single lid which would generally open about a hinge axis extending the length of the box or a pair of lids, one on each side, each of which would pivot upwardly (in a butterfly manner) about the same hinge axis or different hinge axes extending transversely across the box.

The utility of these boxes is virtually unlimited, and hence they are often referred to simply as "utility boxes" although they are more commonly referred to as tool boxes. In this specification, the term "tool box" will be used generically, although it is understood that the term is applicable to a box of this type, regardless of its ultimate use.

Tool boxes of this type are subject to very great physical demands. Thus they must be quite strong in order to support a relatively large load of items placed in the box. In addition, the box must be strong enough to avoid cracking or breaking when jarred upon movement of the vehicle or when impacted upon by other objects located in the bed of the pickup truck. In addition, since the tool box will almost always be used outdoors, protection of the contents requires excellent sealing against moisture.

One representative tool box of this type is shown in U.S. Pat. No. 4,288,011, although the tool box shown therein is somewhat different in that the two main parts are telescopically adjustable with respect to each other.

In any event, because of their size and the structural demands placed upon them, tool boxes of this type have been manufactured and sold only as a completed unit.

However, the relatively large size of tool boxes of this type places limitations on their manufacture and distribution. Manufacturing procedures are limited to those which can be used for such a large item. For example, the procedures for finishing the exterior of the tool box are limited. For example, it would not be economically practical to finish an item of this size by dipping processes whereby a unit is dipped into a bath to treat or paint the interior or exterior surfaces.

In addition, distribution through commerce of tool boxes of this type has been limited. When sold through conventional retain channels, the large size of the unit has dictated that the wholesaler or retailer can maintain only a limited number in inventory. In addition, because of its large size, the tool box could not have been distributed through channels of commerce other than wholesale and retail establishments. Specifically, its size prevented sale of such tool boxes through catalogs or the like because the large size is greater than the relatively stringent size limitations of frequently used package shippers.

SUMMARY OF THE INVENTION

Thus, it is a purpose of the present invention to provide a new and improved tool box of the type commonly used in the bed of a pickup truck which overcomes the disadvantages of such tool boxes as known heretofore.

This purpose of the present invention is achieved by designing and constructing the tool box in individual components. An important feature is to divide the tool box into two separate halves, and preferably the two separate halves are further subdivided.

Because the tool box of the present invention is constructed in individual components, the various manufacturing processes are applied to relatively small sized units rather than to a unit as large as the tool box itself. Additionally, the processes for treating and painting the individual components can be smaller and more economical. For example, whereas it was not practical to dip an entire tool box of this type into a bath for treating, painting or the like, it is a relatively easy process to dip the small individual components.

Another feature of the present invention is that the individual components are specifically designed and shaped so that in the disassembled state they can be physically interrelated to fit into a relatively small space.

Such a small space thus permits shipping and handling in a relatively small package. When such a package is sold through normal wholesale and retail distribution channels, this will allow the wholesaler and the retailer to store tool boxes of this type in a relatively small space. Thus, in contrast to prior practices of the average retailer of keeping only one or two on hand, the retailer can now keep far more on hand and perhaps even inventory and sell a plurality of different models.

Another advantage of the small package is that it meets the stringent size requirements of popular package shippers even though in the fully assembled state it will provide a tool box which is of the correct typical size for use in a pickup truck and which is sufficiently strong and rugged that it can withstand the structural demands placed upon such tool boxes; and at the same time the tool box can be made sufficiently moisture proof to protect the contents thereof.

The stringent shipping size requirements which are satisfied by the features of the present invention are those imposed by the major parcel shipping service in the United States, United Parcel Service. The requirements for shipments by this carrier are a total length plus girth of 130 inches for interstate shipments and a total length plus girth of 108 inches for intrastate shipments. "Girth" refers to the measurement around the article in a plane perpendicular to its length.

The present invention is applicable to tool boxes of any of the materials now commonly used to manufacture such tool boxes including for example, aluminum, carbon steel, stainless steel and plastic. However, one of the requirements of United Parcel Service is that the package must weigh less than 70 pounds. Tool boxes of the present type made of aluminum and plastic will fulfill this requirement. However, tool boxes made out of steel and intended for a full sized pickup truck will weigh more than 70 pounds and hence those tool boxes will not benefit from the advantage of being shippable by United Parcel Service.

In accordance with preferred embodiments of the present invention, these goals are met by designing and shaping the individual components in the following manner. First, the tool box is subdivided by a transverse plane which essentially divides it in half, providing separate lid halves and separate halves for the upper and lower parts. In a first embodiment of the finished package, in each half the upper and lower part are connected together. In a second embodiment of the finished package the upper and lower parts in each half are separated from each other. Either of these embodiments of the finished package are applicable whether the assembled tool box is to have two lid parts connected together to open sideways, i.e., at each end in a butterfly manner or a single top openable as a unit about an axis running the length of the tool box.

The above described first embodiment, i.e., the embodiment wherein the upper and lower parts of each half are connected together before shipment is preferred because this will allow the manufacturer to form a stronger joint having greater waterproof integrity between the upper and lower parts. However, the second embodiment, i.e., the embodiment wherein the upper parts and lower parts are separated from each other in the shipping package has its own advantages. Although it does not permit the upper and lower parts to be connected together during the manufacturing stage, it does provide a much smaller package, thereby benefiting from the advantages associated with a smaller package including economy in storage and shipping. Another advantage of this second embodiment is that because the upper and lower parts are not connected together, the manufacturing costs of this tool box are lower than the first embodiment and hence it can be sold at a lower price.

In accordance with a preferred embodiment of the present invention, these components are physically interrelated, for purposes of being packaged in a small space, by first inverting one of the lower parts upside down relative to the other and placing one side of one lower part into the inside of the other lower part. In that embodiment in which the upper and lower parts of each half are separated from each other, the upper parts are slid along their respective lower parts so that the tops of the respective upper and lower parts of each half lie in the same plane.

In each of the above described preferred packaging embodiments, one lid half is placed on top of the assembled components and the other on the bottom.

The final tool box will include a number of small components including a central piece which links the two lid halves together, a connection piece for connecting the two bottoms together, a tray located in the upper part and connecting means such as bolts or the like, all of which small components would be shipped along with the packaged tool box. Both embodiments of the preferred package include a central space which is large enough to receive all of these small components.

Thus, it is an object of the present invention to provide a new and improved tool box of the type mounted in the bed of a pickup truck.

It is another object of the present invention to provide a new and improved tool box of the type mounted in the bed of a pickup truck which is constructed in relatively small components which are then assembled to form the finished tool box.

It is another object of the present invention to provide a tool box of the present type constructed in the form of individual components which are formed essentially by dividing the tool box transversely into halves, thereby permitting the use of more economical manufacturing procedures.

It is another object of the present invention to provide a new and improved tool box of the present type which is assemblable from components specifically designed and shaped to be packaged in a small space.

It is another object of the present invention to provide a new and improved tool box of the present type constructed in the form of individual components comprising halves of the major portions, i.e., halves of the lids, upper parts and lower parts, and physically interrelating these parts for shipping purposes with one lower part turned upside down and with one of its sides located in the interior of the other lower part.

It is another object of the present invention to provide a new and improved package meeting the stringent size requirements of major package shippers and containing therein all of the components necessary to assemble therefrom a tool box of the type commonly used in the bed of a pickup truck.

These and other objects of the present invention will become apparent from the detailed description to follow.

BRIEF DESCRIPTION OF THE DRAWINGS

There follows a detailed description of preferred embodiments of the present invention which are to be read together with the accompanying drawings wherein.

DETAILED DESCRIPTION OF THE PREFERRED EMBODIMENTS

Referring now to the drawings, like elements are represented by like numerals throughout the several views.

Figure 1:
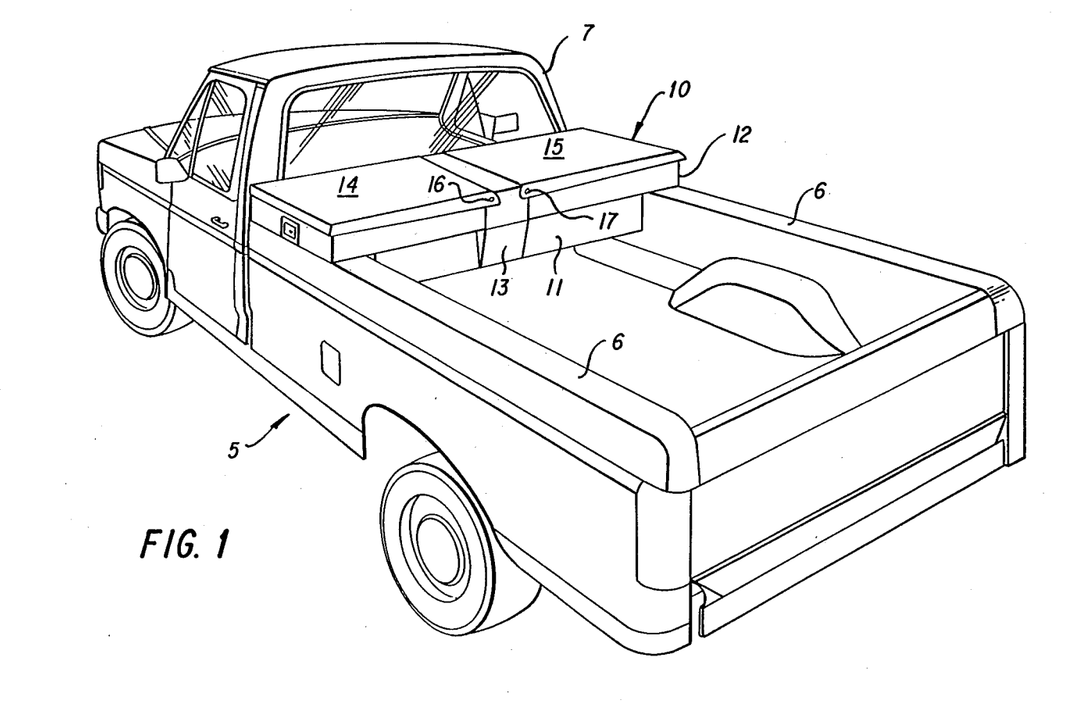
FIG. 1 is a perspective view of a pickup truck with a tool box of the present invention mounted thereon.

FIG. 1 illustrates a tool box 10 of the type with which the present invention is concerned, which is used in conjunction with a pickup truck 5, having side panels 6. In some tool boxes the bottom of the tool box rests on the bed of the pickup truck. But in most cases the bottom of the tool box is raised above the surface of the bed in order to provide a space beneath the box for holding long objects such as boards, while still being able to close the tailgate. In these cases of course the weight of the tool box rests entirely on the side panels 6. As illustrated, the tool box is generally mounted at the front end of the bed just behind the cabin 7.

Figures 9, 10:
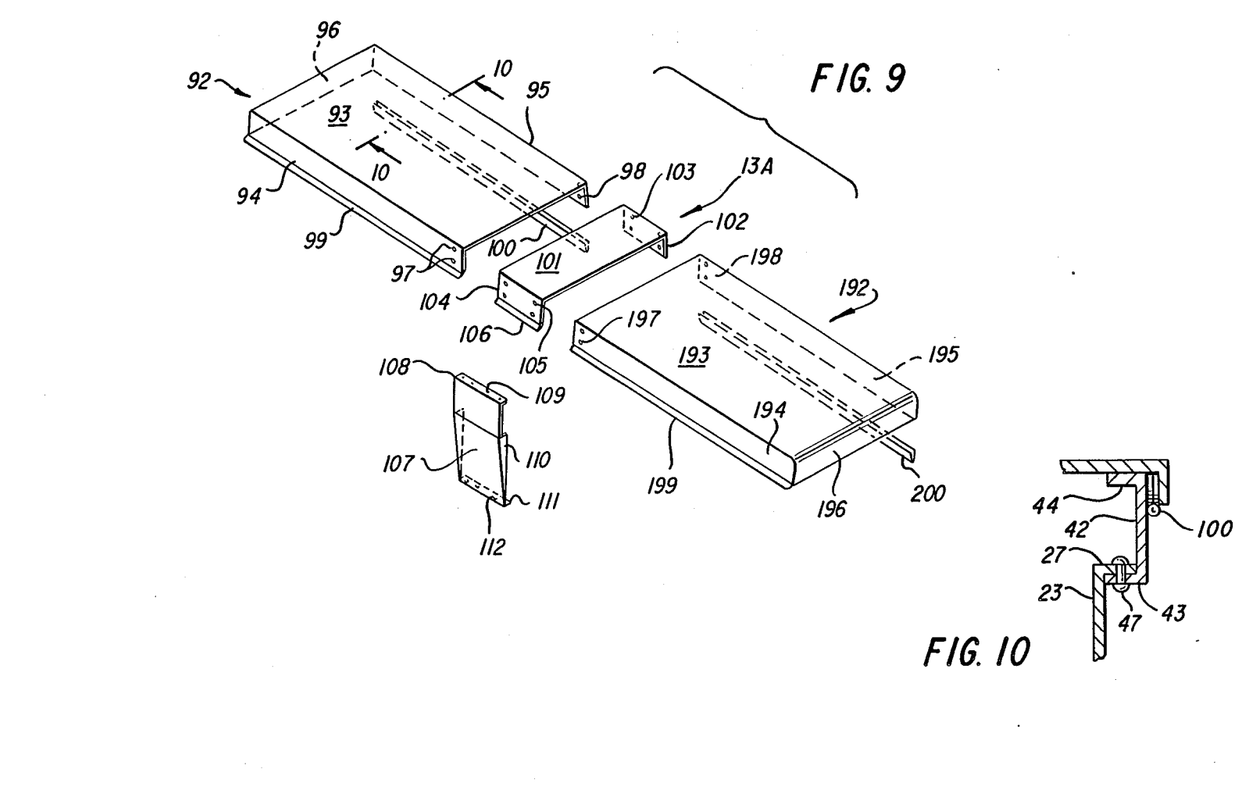
FIG. 9 is a partial perspective exploded view of a modification of the invention showing a single top of a tool box.
FIG. 10 is a partial cross-sectional view of a portion of FIG. 9, when assembled, and taken in a vertical plane through line 10—10 of FIG. 9.

The tool box of this type generally comprises a lower part 11 which extends down into the bed area beside the side panels, an upper part 12 which is longer than the lower part 11 to thereby include outwardly extending portions which rest on the tops of the side panels 6. Tool boxes of this type can have different lid structures. FIG. 1 illustrates a lid structure comprising a center piece 13 and a pair of lids 14 and 15, each pivotable about connections 16 and 17, respectively, to pivot upwardly and inwardly toward the center of the vehicle, in butterfly fashion. Other models of tool boxes may comprise a single top which would generally be hinged to the upper part 12 for pivotal movement about an axis running lengthwise of the tool box. Such a single top for a tool box of this type is shown in FIG. 10.

Figure 2:
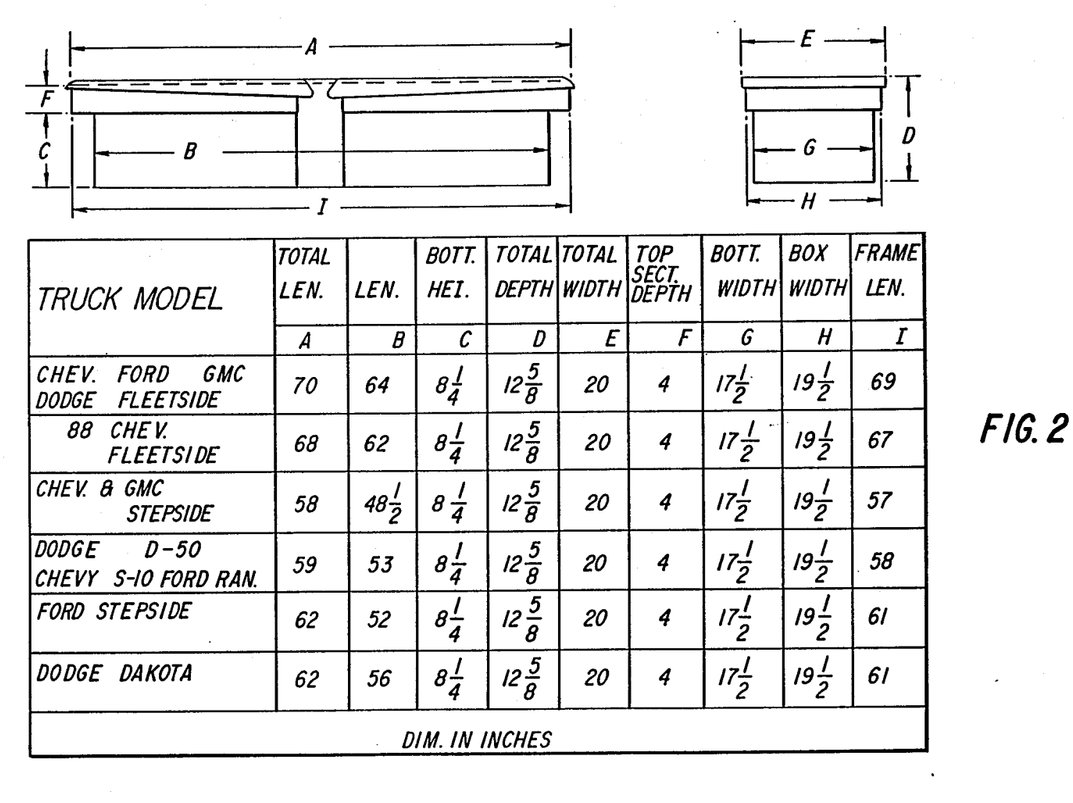
FIG. 2 comprises side and end view diagrams and a chart showing typical dimensions of tool boxes of the present invention for several different pickup truck models.

Tool boxes of this type are generally of the shape as shown in FIG. 1. However, they will generally be of slightly different sizes in order to match the different models of pickup trucks. FIG. 2 comprises a schematic side and end view of the tool box 10 with letters designating the various dimensions. The bottom part of FIG. 2 is a chart showing dimensions keyed to the letters of the diagrams to show the dimensions for the tool box 10 for six of the most popular pickup truck models.

As is apparent from FIG. 2, the tool boxes 10 vary, but only over a relatively narrow range, the main difference being changes in length to accommodate different width pickup truck models. The features of the present invention, as described below, are applicable to all of the tool boxes listed in FIG. 2. However, these are merely representative and the present invention is also applicable to tool boxes made for many other pickup trucks.

An important feature of the present invention is that the basic division of the tool box into components is accomplished by cutting the tool box transversely so as to subdivide all of the major components of the tool box into half parts. This basic feature of the invention, as it will be described in greater detail below, provides individual components of small enough size to facilitate manufacturing processes and to allow arranging of the components into a relatively small size for shipping and storage.

Figures 3, 4:
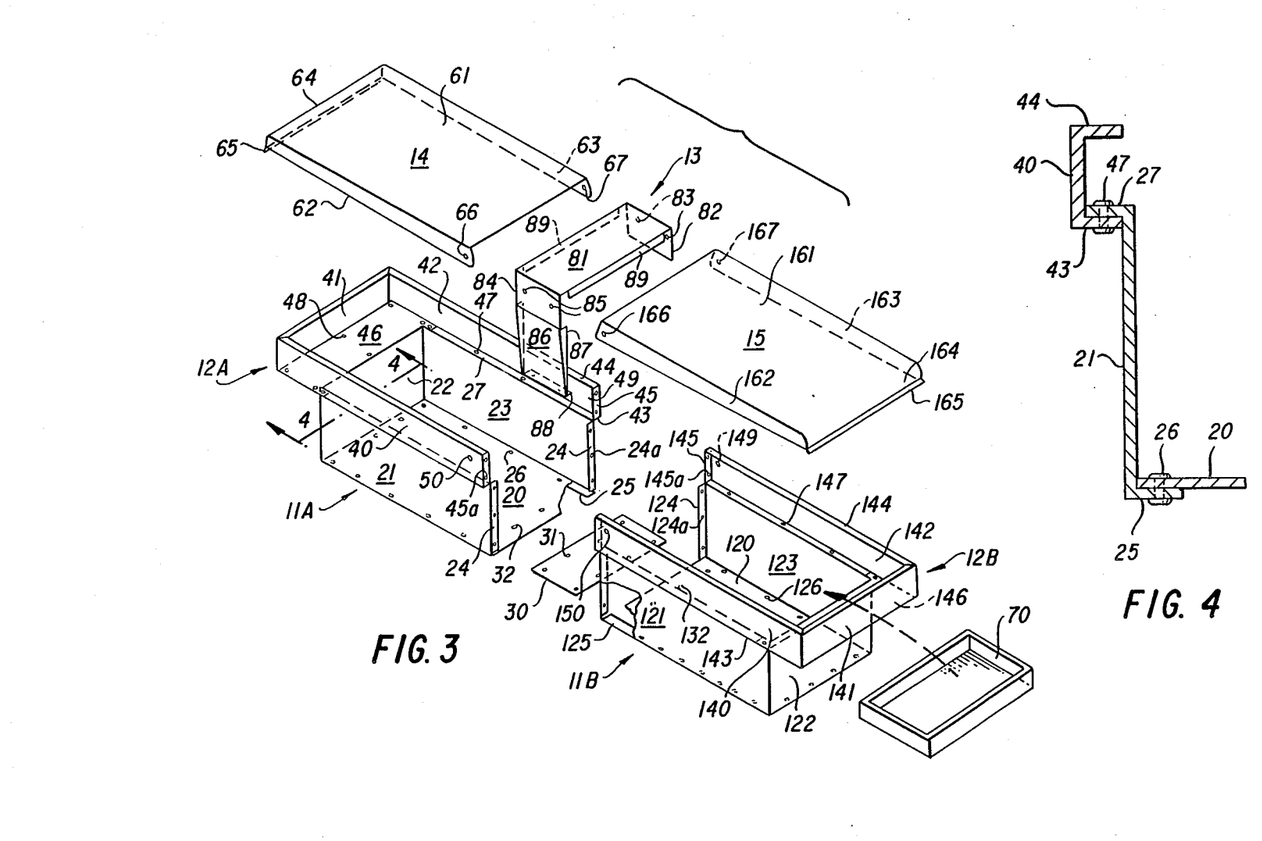
FIG. 3 is an exploded perspective view of the tool box of FIG. 1 with the individual components separated from each other.
FIG. 4 is a partial cross-sectional view taken through a vertical plane passing through line 4—4 of FIG. 3.

FIG. 3 illustrates the tool box 10 separated into its individual components. FIG. 4 is an enlarged view of a portion thereof. In FIG. 3, the separated upper parts 12A and 12B are shown attached to their respective lower parts 11A and 11B. This in fact constitutes the first packaging embodiment of the present invention, i.e., starting from the elements in the form as shown in FIG. 3 with the upper parts 12A and 12B connected to their respective lower parts 11A and 11B. The first packaging embodiment will be described below with reference to FIGS. 5A through 5C and 6. The second embodiment starts from the elements essentially as shown in FIG. 3 except with the upper parts 12A and 12B disconnected from their respective lower parts 11A and 11B. The second packaging embodiment will be described in greater detail below with reference to FIGS. 7A through 7C and 8.

Referring now to FIG. 3, since the two halves are symmetrical, mirror images of each other, the following description will refer only to the left hand portions of elements 11A and 12A, and it is understood that the numerals on the right hand portions referring to essentially the same elements are simply raised by 100. Similarly, the two lids 14 and 15 are symmetrical, mirror images of each other. The details of the left hand lid 14 will be described, and it is understood that the essentially identical details of the right hand lid 15 use the same numerals except raised by 100.

Referring to FIGS. 3 and 4, the lower part 11A preferably includes a separate bottom piece 20. Surrounding three sides of the bottom piece is a single piece of material comprising the three side walls, 21, 22 and 23 of lower part 11A. These three side walls include flanges 25 which extend under the bottom piece 20 on three sides. The inside edges of side walls 21 and 23 include vertical inturned flanges 24. The three side walls 21 through 23 further include upper outwardly projecting horizontal flanges 27. The upper part 12A includes side walls 40 and 42 and an end wall 41, preferably formed from a single piece of material. The bottom edges of the three walls 40, 41 and 42 include inturned flanges 43 which fit just beneath the upper outwardly turned flanges 27 of the lower part. See FIG. 4.

The upper part 12A also includes upper inturned flanges 44 which cooperate with the lid structure to support same and assist in keeping out moisture. The upper part also includes a separate shelf plate 46.

A connector plate 30 having bolt holes 31 therein is mounted on the bottom inside of the assembled unit, interconnecting and strengthening same. Bolts would pass through the bolt holes 31 of the connector plate 30 and engage bolt holes 32 and 132 in the bottoms 20 and 120 of the lower parts 11A and 11B.

FIGS. 3 and 4 also illustrate various connecting means including rivets, bolts or the like 26 connecting the bottom 20 to the flanges 25; bolts, rivets or the like 47 connecting flanges 27 to flanges 43 and bolts, rivets or the like 48 connecting the shelf plate 46 to a flange 43 at its outer end and a flange 27 at its inner end.

The major difference between the first packaging embodiment, utilizing upper and lower parts as shown in FIG. 3 and the second packaging embodiment is that in the latter the upper and lower parts are disconnected from each other and the bottom plate 20 and the shelf plate 46 are also disconnected. Consequently, in making the upper and lower part unit for the first embodiment, those elements which are shown connected together are permanently secured together in the manufacturing process. This is accomplished by using rivets rather than bolts at elements 26, 47 and 48 and by sealing the spaces between the flanges at these locations with silicone. It is thus a feature of the present invention that welding, which was used very significantly in the prior art, is essentially avoided even in the first packaging embodiment of the present invention. The remaining connections which are not permanent are to be made by the end user and hence convenient removable connecting means such as nuts and bolts and the like will be provided for connecting together all of those elements which are shown separately in FIG. 3 and are in fact shipped in the unconnected state as shown.

In the second packaging embodiment which is to be described below, none of the pieces are connected together, i.e., the upper parts and lower parts are separated from each other and the bottom 20 and the shelf plate 46 are also disconnected. In this case the unit as shipped would include convenient removable nuts, bolts and the like for making these connections.

FIG. 3 further illustrates the lids 14 and 15. The left hand lid 14 includes a top 61, side walls 62 and an end wall 64 which is provided with an outwardly turned flap 65 to facilitate grasping and opening the top 14. The inner ends of sides 62 and 63 include bolt holes 66 and 67 which will mate with bolt holes 83 and 85 in the center piece 13, passing outside of the side flanges of this outer piece as shown in FIG. 1.

The center piece 13 provides both structural and aesthetic advantages. Structurally, it assists in anchoring together the two lids and the visible sides of the tool box (the other side being essentially out of view up against the cab of the pickup truck, as is apparent from FIG. 1). This center piece 13 includes a top 81 a rear plate 82 having bolt holes 83 therein, and a front plate including an upper part 84 and a lower part 86. The upper part 84 includes bolt holes 85. The lower part 86 includes side flanges 87 and a lower flange 88. The side flanges 87 fit snugly under the bottoms of the upper parts, i.e., up against the inturned flanges 43, while the inner edges thereof are vertical edges (the outside portion of 86 being tapered inwardly) to fit snugly up against the side walls 21 and 121. The lower plate 88 is secured by the end bolts which connect the connector plate 31 to the bottoms 20 and 120. Connector piece 81 also includes side flanges 89 which extend downwardly to provide additional waterproofing for the tool box.

Finally, tool boxes of this type commonly employ trays, one of which is shown at 70 in FIG. 3 to rest on the ledge formed between the upper and lower parts. A problem has existed in the past in that these trays would tend to slide inadvertently along the rail formed by these flanges as the pickup truck turned a bend or the like. In the present invention, however, the rivets or bolts 47 can be used as stop means to prevent slipping of the tray 70.

Figure 5A:
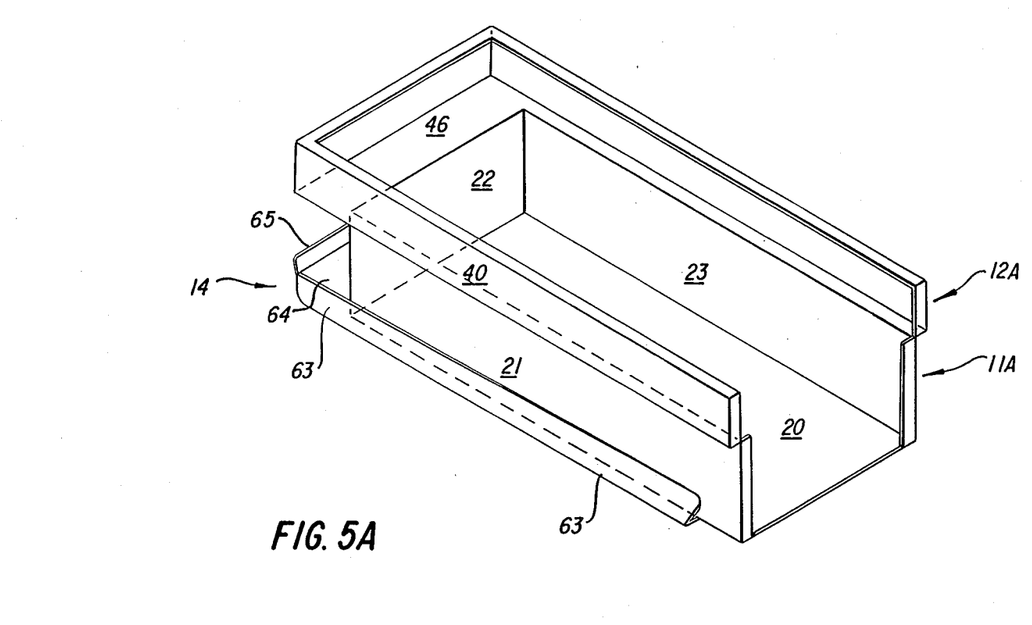
FIGS. 5A through 5C are perspective views showing the different stages for packaging the components of the tool box in accordance with a first packaging embodiment of the present invention.
Figure 5B:
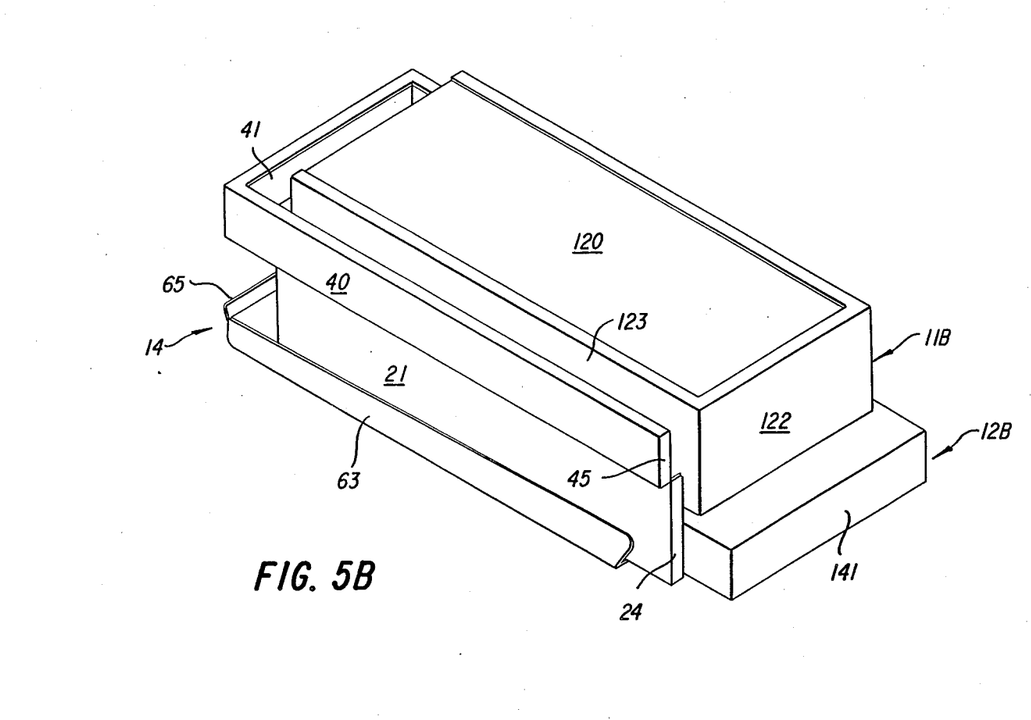
Figure 5C:
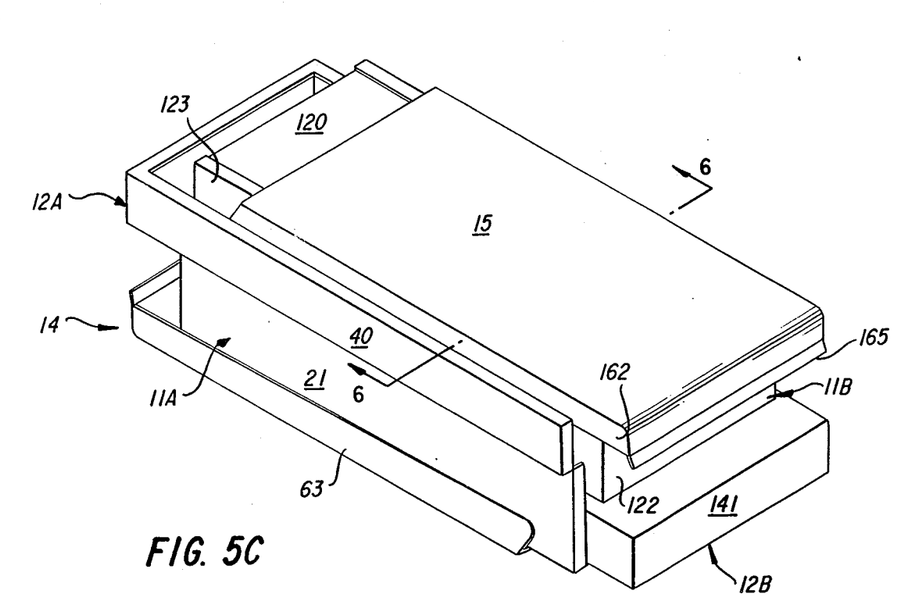

FIGS. 5A through 5C are schematic views illustrating a first packaging embodiment for packaging the components which when assembled will form the tool box 10. In this first embodiment the upper parts 12A and 12B are connected to their respective lower parts 11A and 11B. Referring to FIG. 5A, one of the lids, for example lid 14 would be placed upside down and one of the upper-lower half units, for example 11A and 12A would be placed therein with the end wall 22 adjacent lid end wall 64. Referring to FIG. 5B, the other unit 11B, 12B would then be turned upside down and positioned to straddle one of the side walls, for example 23 and 42 of the first unit. The units are then pushed against each other end-to-end and side-to-side to minimize the space taken up by these units.

Finally, as shown in FIG. 5C the other lid 15 would be placed over the top of the bottom piece 120.

It will be evident that in this embodiment a relatively large central space is formed within the two units. This space would be utilized to accommodate small accessories including for example connector plate 30, central piece 13, one or more trays 70 and other accessories such as boxes of bolts, instructions or the like.

Figure 6:
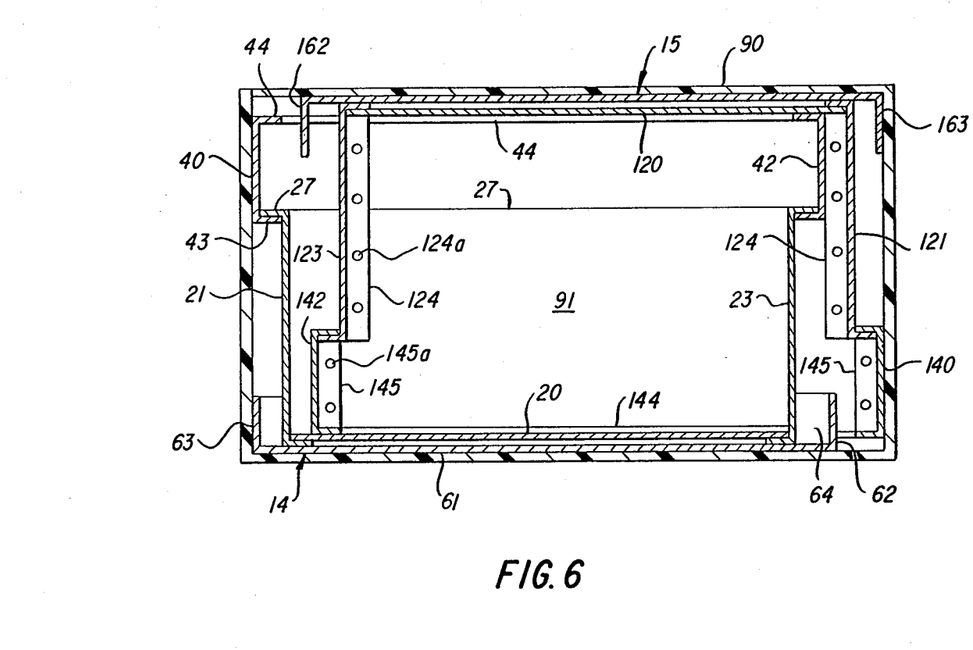
FIG. 6 is a transverse cross-sectional view taken in a vertical plane through line 6—6 of FIG. 5C and including an outer package.

FIG. 6 shows in cross section the fully packaged embodiment of FIG. 5C within an outer container 90 as it would be shipped in commerce. The large central space 91 is shown in FIG. 6.

In this embodiment, the length of the package the direction perpendicular to the plane of FIG. 6 is 39 inches. Referring to FIG. 6, for any of the truck models described in FIG. 2, the width of this package is 20 ¼ inches and the height is 13¼ inches. This gives a girth of 67 inches. Adding this girth to the length of 39 inches, this package meets the 108 inch limit for intrastate shipping by United Parcel Service.

Figure 7A:
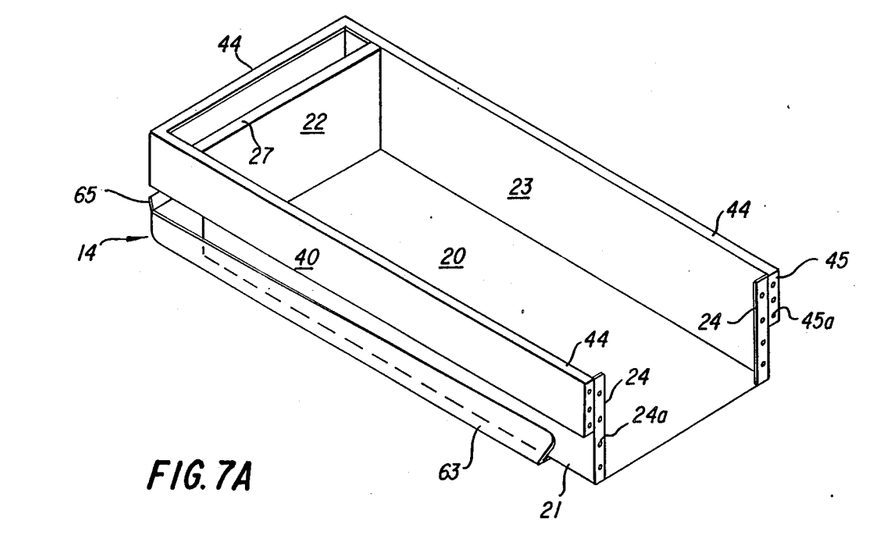
FIGS. 7A through 7C are perspective views showing the different stages for packaging the components of the tool box in accordance with a second packaging embodiment of the present invention.
Figure 7B:
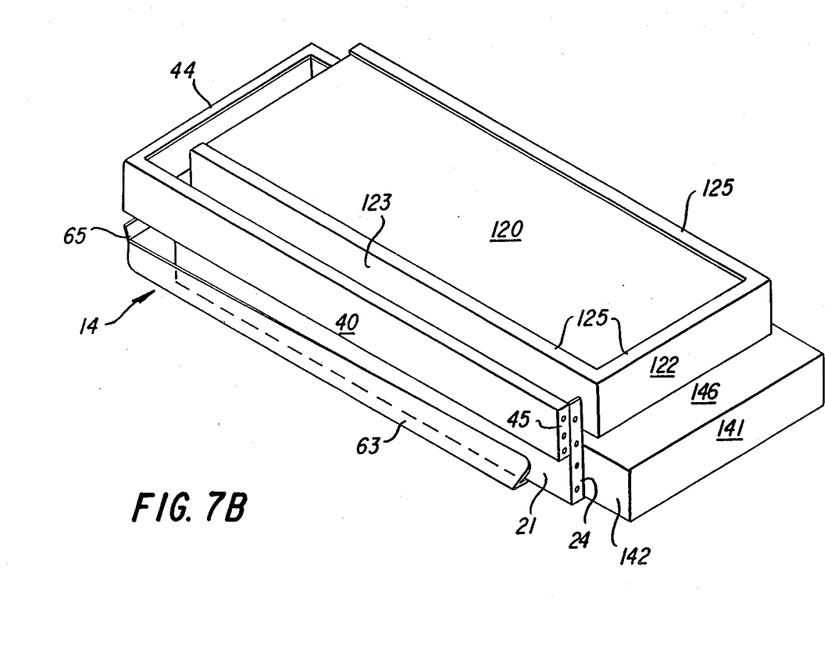
Figure 7C:
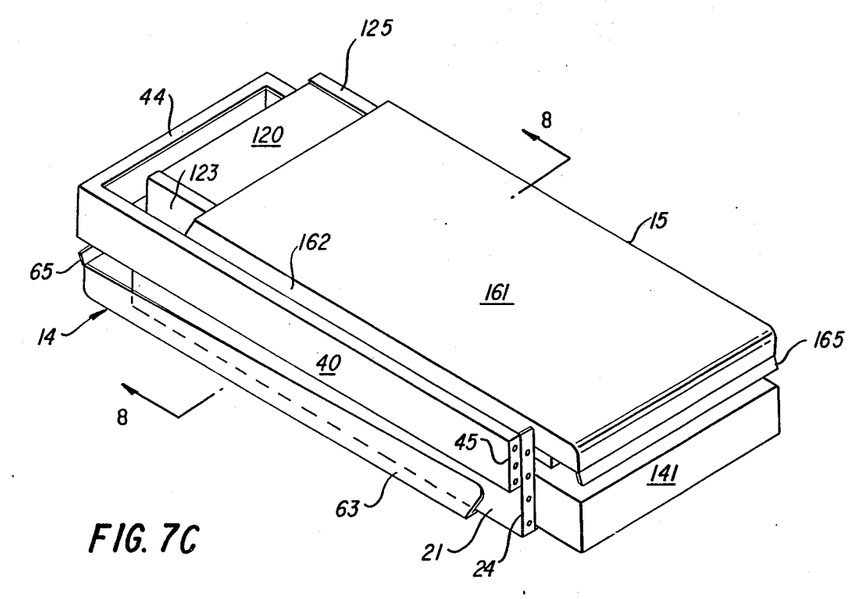

FIGS. 7A through 7C illustrate the steps in packaging the second packaging embodiment of the present invention. The steps as illustrated in FIGS. 7A through 7C are essentially the same as the steps as illustrated in FIGS. 5A through 5C with a few changes. First, in this case the upper parts 12A and 12B are not connected to their respective lower parts 11A and 11B. Also, bottoms 20, 120 and shelf plates 46, 146 are also disconnected. The bottoms, even though disconnected will not change their positions in the package. However, the shelf plates will simply be moved to the central space. Thus, as illustrated in FIG. 7A, the upper part 12A is not connected to the lower part 11A, but instead it has dropped down vertically so that its upper flanges 44 rest on the flanges 27 of the lower part 12A, as the whole unit 11A, 12A sits on the inverted lid 14. Referring to FIG. 7B, the other unit 11B, 12B is turned upside down and placed into the first unit 11A, 12A in the same manner as in FIGS. 5 and 6 except that in this case the flanges 127 on the lower part 11B continue to move downwardly against the flanges 144 of upper part 12B. As with FIGS. 5A through 5C, the other lid 15 is then placed overtop of the bottom 120. Since the upper parts move relative to their respective lower parts it is also necessary to shift lid 15 slightly to the right so side 162 will not interfere with flange 24 and shift lid 14 slightly to the left so flange 62 will not interfere with flange 124.

Figure 8:
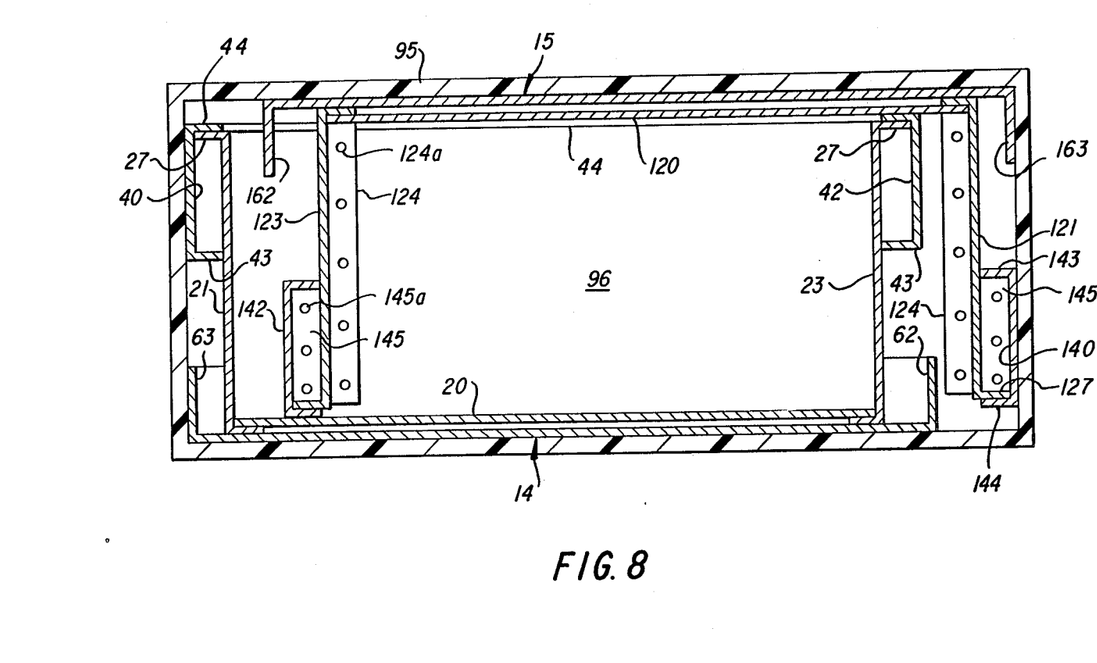
FIG. 8 is a transverse cross-sectional view taken in a vertical plane through line 8—8 of FIG. 7C and including an outer package.

Referring to FIG. 8, the package is contained within a carton 95. This carton 95 is smaller than the carton 90. Specifically, this carton is of the same length, 39 inches (taken in the direction perpendicular to the plane of FIG. 8) a width of 22 and ½ inches and a height of 9 and ¾ inches. This gives a girth of 64 ½ inches which together with the length of 39 inches adds up to 103 ½ inches, well below the 108 inch United Parcel Service intrastate limitation.

This second packaging embodiment of FIGS. 7A through 7C and 8 has the advantage of greater compactness and economy. It is more compact because the upper parts slide vertically with respect to the lower parts, thus allowing a smaller package. This would be a significant advantage for tool boxes sold through conventional wholesale and retail channels of commerce since it would improve the ability to inventory tool boxes of this type. In addition, this embodiment is economical because the few pieces which are utilized to make up the tool box can be economically packaged without incurring any manufacturing labor costs for partial assembly. Of course this second embodiment will not provide the same degree of waterproof integrity at the juncture between the lower part and the bottom or between the lower part and the upper part as in the first embodiment. However, in environments where the need for great waterproof integrity is not present, this second embodiment will provide a very attractive alternative.

Assembling a tool box from the components as shown in FIG. 3 (or as further subdivided to form the basis of the second packaging embodiment) will be apparent. After the upper and lower parts are connected together and the lower part is connected to the bottom plate (either as the first embodiment is shipped or after partial assembly of the second embodiment) the two upper part-lower part units are connected together. Flanges 24 and 124 are preferably covered with a foam having adhesive on one side, after which these flanges are connected together with convenient fastening means such as nuts and bolts. The connector plate 30 is then placed inside of the box over the abutting edges of bottoms 20 and 120 and secured by nuts and bolts passing through openings 31 and 32. For this purpose the vertical flanges 24 and 124 are recessed at the bottom just enough to receive the thickness of the connector plate 30. Next, central piece 13 is placed over the upper parts and secured in place in the rear by bolts passing through bolt holes 83 and plate 82 and bolt holes 49 and 149 in side walls 42 and 142. The plate 84 is then secured to the front of the upper parts by bolts passing through openings 85 and 50, 150. The lower front plate 86 is then snapped into place against walls 21 and 121 and the lower flange 88 is turned under the box and secured by bolts through openings in flange 125 and connector plate 30.

The two lids 14 and 15 are then connected to the central piece 13 as the inner ends of walls 62, 63 and 162, 163 are received on the outside of the respective plates 82 and 84 of the central piece 13, whereat they are secured in place by suitable bolts.

It is often desirable in tool boxes of this type to utilize a top which is a single piece from end-to-end, opening from the side rather than two separate pieces opening from the ends. Such a side opening single piece top would generally be hingedly mounted for pivotal movement about a hinge running the length of the tool box.

Such a single piece top, made for use in the present invention is shown in an exploded view in FIG. 9 and in a partial sectional view at FIG. 10. The top, which is one piece in use, is actually comprised of separate halves 92 and 192 comprising tops 93, 193, sides 94, 95 and 194, 195 and end walls 96, 196.

A central brace 13A is provided. However, unlike the center piece 13 in the embodiments of FIGS. 1 through 8, in this case the two top pieces 92 and 192 are rigidly connected to the center brace 13A rather than connected for pivotal movement relative thereto.

The center brace 13A includes a top 101, a rear wall 102 and a front wall 104, the latter including bolt holes 103 and 105, respectively. The center brace includes a lip 106 which is aligned with the raised lips 99 and 199 on the parts 92, 192. To rigidly secure the separate halves to the center brace 13A, the half 92 is secured thereto by bolts passing through bolt holes 97 and 104 on the one hand and 98 and 103 on the other hand. The other half 192 is secured to the center brace by bolts passing through openings 105 and 197 on the one hand and 102 and 198 on the other hand.

FIG. 9 illustrates the two hinge halves 100 and 200. Referring to FIG. 10, the two legs of each hinge would be secured on the one hand to the outside of the upper part on that side of the box and on the other hand to the inside of its respective lid half.

Even in the embodiment using a one piece top, it is preferable to use a front piece corresponding to the front portion of central piece 13 of FIGS. 1 through 8. This front piece, which is shown at 107 in FIG. 9, is similar to the front portion of the front piece 13 as shown in FIG. 3 except that at the top of the front, instead of being connected to the horizontal top (81 in FIG. 3), the top piece of FIG. 9 terminates in a flange 108 including openings 109 for using suitable bolts or the like to connect this piece through suitable bolt holes provided in upper flanges 44. As in the embodiment of FIG. 3, the lower front piece 107 includes side flanges 110 which engage the front walls 21 and 121 underneath of flanges 43 and include a lower flange 11 which is secured underneath of the tool box in the same manner as flange 88 of FIG. 3.

As manufactured, various edges which are not permanently connected together, but which will form an outer edge of the finished tool box may be provided with sealing strips in the form of a length of foam material with an adhesive on one side. Such a strip may be provided for example on the interior of the lids where the lids will engage the upper flanges 44, 144. Additionally, as noted above, vertical flanges 24, 124 and 45, 145 may be provided with such sealant strips. Additionally, in the second packaging embodiment wherein all of the major components are disconnected from each other, the surfaces to be connected together may be supplied with such lengths of adhesively attached foam material for sealing purposes.

Although the invention has been described in considerable detail with respect to preferred embodiments, it will be understood that the invention is capable of numerous modifications and variations apparent to those skilled in the art, without departing from the spirit and scope of the invention.

I claim:

1. A tool box of the type which, in an assembled condition has an elongated lower part and an elongated upper part and which extends beyond the lower part at both ends, and lid means covering the upper part, which tool box is of the type adapted to fit across the bed of a pickup truck such that the outer ends of the upper part extends over onto the side panels of the pickup truck, the tool box being made from a plurality of components which are connected to form the tool box;

said components including, a pair of lower part components, each having an end wall and adjacent side walls and being open across from the end wall, a pair of upper part components, each having an end wall and adjacent side walls and being open across from the end wall, each upper part component, in the disassembled state being substantially completely open in the area bounded by the tops of said end wall and said side walls, the bottom of each upper part component being connectable to the top of a respective lower part component, a pair of bottom pieces, one connectable to the bottom of each lower part component, and said lid means comprising a pair of lid pieces, each having a top, opposed side walls and an end wall, and wherein in the assembled state the side walls and end wall of each lid piece overlaps the upper portion of the side walls and end wall, respectively, of a respective upper part component, whereby the components, in the unassembled state, are capable of being packaged together with one lower part component turned upside down with one of its sides between the two sides of the other lower part component.

2. A tool box according to claim 1, wherein in the packaged condition each lower part component has attached to it its respective upper part component to form a unit.

3. A tool box according to claim 1, wherein in the packaged condition each lower part component is disconnected from its respective upper part component.

4. A tool box according to claim 1, including a central piece which, in the assembled condition of the tool box, is positioned to extend transversely over the upper part and down along one side of the assembled lower part.

5. A tool box according to claim 1, wherein the two side walls and end wall of each of the upper and lower part components are formed of a single piece of sheet metal bent into a shape to form that component.

6. A tool box according to claim 1, wherein the assembled tool box is of a metallic material and is connected together substantially without welding.

7. A tool box according to claim 1,
said components being arrangable, prior to their assembly into a tool box, in an essentially rectangular package having a girth plus length of no more than 130 inches.

8. A tool box according to claim 7, wherein the girth plus length of the package is not more than 108 inches.

9. A tool box according to claim 8, wherein each of the lid means, upper and lower parts are divided generally transversely into two generally symmetrical halves.

10. A tool box according to claim 9, wherein in the packaged condition each lower part half has attached to it its respective upper part half to form a unit.

11. A tool box according to claim 10, wherein the packaged condition, one of the two units formed by a connected lower part half and upper part half is turned upside down in position so that one of its sides is inside the other unit, adjacent a side of said other unit, and the other of its sides is positioned outside of the other unit, adjacent the other side thereof.

12. A tool box according to claim 11, wherein, in the packaged condition, one lid piece is below the lower of the two units and the other lid piece is above the upper of the two units, each of the tops of each lid piece lying adjacent the bottom of its respective unit.

13. A tool box according to claim 12, wherein the lid means is of the type comprising a central piece and a pair of said lid pieces, each of which lid pieces is connected to the central piece to pivot up about a transverse axis passing through the connection of each lid piece to the central piece, and wherein in the packaged condition the central piece is located in a central space between the two units.

14. A tool box according to claim 12, wherein the lid means is of the type comprising a central piece and a pair of said lid pieces rigidly connected to the central piece to form a unitary lid means, which unitary lid means is pivotable about a longitudinal axis extending along one long side of the upper part of the tool box, and wherein in the packaged condition the central piece is located in a central space between the two units.

15. A tool box according to claim 11, wherein, in the assembled condition, the tool box includes a tray which rests on the lower edges of the upper part, and wherein in the packaged condition the tray fits within a central space between the two units.

16. A tool box according to claim 9, wherein in packaged condition each lower part component is disconnected from its respective upper part component.

17. A tool box according to claim 16, wherein in the packaged condition one of the two lower part components is turned upside down in position so that one of its sides is inside the other lower part component, adjacent a side thereof and the other of its sides is outside the other lower part component with its other side adjacent the other side thereof.

18. A tool box according to claim 17, wherein in the packaged condition each upper part component surrounds its respective lower part component and is shifted vertically relative thereto so that the top of the upper part component is at the same level as the top of its respective lower part component.

19. A tool box according to claim 18, wherein one lid piece is below one of the lower part components and the other lid piece is above the uppermost of the two lower part components, each of the lid pieces having its top lying against the bottom of its respective lower part component.

20. A tool box according to claim 19, wherein the lid means is of the type comprising a central piece and a pair of said lid pieces, each of which lid pieces is connected to the central piece to pivot up about a transverse axis passing through the connection of each lid piece to the central piece, and wherein in the packaged condition the central piece is located in a central space between the two lower part components.

21. A tool box according to claim 19, wherein the lid means is of the type comprising a central piece and a pair of said lid pieces rigidly connected to the central piece to form a unitary lid means, which unitary lid means is pivotable about a longitudinal axis extending along one long side of the upper part of the tool box, and wherein in the packaged condition the central piece is located in a central space between the two lower part components.

22. A package of generally rectangular shape and having a girth plus length of no more than 130 inches, said package comprising component parts of a tool box, which, when assembled together, constitutes a tool box of the type having an elongated lower part and an elongated upper part which is longer than the lower part and which extends beyond the lower part at both ends and including a lid means covering the upper part, which tool box is of the type adapted for fitting across the bed of a pickup truck such that the outer ends of the upper part extend onto the side panels of the pickup truck;

said components including,
a pair of lower part components, each having an end wall and adjacent side walls and being open across from the end wall,
a pair of upper part components, each having an end wall and adjacent side walls and being open across from the end wall, each upper part component, in the disassembled state being substantially completely open in the area bounded by the tops of said end wall and said side walls,
the bottom of each upper part component being connectable to the top of a respective lower part component,
a pair of bottom pieces, one connectable to the bottom of each lower part component,
and said lid means comprising a pair of lid pieces, each having a top, opposed side walls and an end wall, and wherein in the assembled state the side walls and end wall of each lid piece overlaps the upper portion of the side walls and end wall, respectively, of a respective upper part component.

23. A package according to claim 22, wherein the length plus girth is not more than 108 inches.

24. A package according to claim 23, wherein the tool box in its assembled condition has a lower part of at least 45 inches in length and an upper part at least 55 inches in length.

25. A package according to claim 23, wherein each of the lid means, upper and lower parts are divided generally transversely into two generally symmetrical halves, and the package has a central space.

26. A package according to claim 25, wherein the assembled tool box includes smaller components including a central piece and connecting means, and said smaller components are positioned in the central space.

27. A tool box of the type having an elongated lower part and an elongated upper part which is longer than the elongated lower part and which extends beyond the lower part at both ends, and a lid means covering the top part, which tool box is of the type adapted to fit across the bed of a pickup truck such that the outer ends of the upper part extend over onto the side panels of the pickup truck, comprising:

a pair of lower part components, each having an end wall and adjacent side walls and being open across from the end wall, a pair of upper part components, each having an end wall and adjacent side walls and being open across from the end wall, each upper part component, in the disassembled state being substantially completely open in the area bounded by the tops of said end wall and said side walls, the bottom of each upper part component being connected to the top of a respective lower part component, a pair of bottom pieces, one attached to the bottom of each lower part component, and a lid covering each upper part component, the upper and lower part components being connected to the other of the respective upper and lower part components at a central transverse plane of the tool box, and a central piece overlying the top and at least a portion of each long side of the tool box, the lid pieces connected to the central piece.

28. A tool box according to claim 27, wherein the two side walls and end wall of each of the upper and lower part components are formed of a single piece of sheet metal bent into a shape to form that component.

29. A tool box according to claim 27, wherein the assembled tool box is of a metallic material and is connected together substantially without welding.

30. A tool box according to claim 27, wherein the said lid means is of the type comprising a central piece and a pair of said lid pieces, each of which lid pieces is connected to the central piece to pivot up about a transverse axis passing through the connection of each lid piece to the central piece, and wherein in the packaged condition the central piece is located in a central space between the two lower part components.

31. A tool box according to claim 27, wherein the lid means is of the type comprising a central piece and a pair of said lid pieces rigidly connected to the central piece to form a unitary lid means, which unitary lid means is pivotable about a longitudinal axis extending along one long side of the upper part of the tool box, and wherein in the packaged condition the central piece is located in a central space between the two lower part components.

* * * * *